United States Patent
Hopkins, III

(10) Patent No.: US 8,833,639 B1
(45) Date of Patent: Sep. 16, 2014

(54) SYSTEM AND METHOD FOR FINANCIAL TRANSACTIONS

(75) Inventor: John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 56 days.

(21) Appl. No.: 11/739,349

(22) Filed: Apr. 24, 2007

(51) Int. Cl.
*G06F 17/00* (2006.01)

(52) U.S. Cl.
USPC .......................................................... 235/375

(58) Field of Classification Search
CPC ....... G07F 19/20; G07F 19/211; G07F 17/16; G07F 17/42; G07F 19/201; G06Q 20/1085; G06Q 20/18; G06Q 20/108; G06Q 20/40; G06Q 20/04; G06Q 40/00; G06Q 40/02
USPC .......................................................... 235/379
See application file for complete search history.

(56) References Cited

U.S. PATENT DOCUMENTS

| | | | |
|---|---|---|---|
| D249,900 S | * | 10/1978 | Lee .................................. D99/28 |
| 5,606,496 A | * | 2/1997 | D'Agostino .................... 396/235 |
| 5,644,727 A | | 7/1997 | Atkins |
| 5,661,283 A | | 8/1997 | Gallacher et al. |
| 5,745,160 A | | 4/1998 | Ishida |
| 5,845,256 A | | 12/1998 | Pescitelli et al. |
| 6,006,988 A | | 12/1999 | Behrmann et al. |
| 6,045,039 A | | 4/2000 | Stinson et al. |
| 6,105,009 A | * | 8/2000 | Cuervo ............................ 705/43 |
| 6,223,983 B1 | | 5/2001 | Kjonaas et al. |
| 6,850,901 B1 | | 2/2005 | Hunter |
| 6,945,457 B1 | * | 9/2005 | Barcelou ........................ 235/380 |
| 7,178,720 B1 | | 2/2007 | Strubbe |
| 7,644,041 B1 | * | 1/2010 | Schultz et al. ................... 705/43 |
| 2001/0007332 A1 | * | 7/2001 | Kjonaas et al. ............... 235/379 |
| 2002/0026426 A1 | * | 2/2002 | Bennett ............................ 705/64 |
| 2004/0169722 A1 | * | 9/2004 | Pena .......................... 348/14.01 |
| 2005/0086600 A1 | * | 4/2005 | Black et al. .................... 715/706 |
| 2005/0211764 A1 | * | 9/2005 | Barcelou ........................ 235/379 |
| 2006/0037835 A1 | * | 2/2006 | Doran et al. ................... 194/302 |
| 2006/0212407 A1 | * | 9/2006 | Lyon ................................ 705/71 |
| 2007/0045395 A1 | * | 3/2007 | Corona et al. ................. 235/379 |
| 2007/0125620 A1 | * | 6/2007 | Sorenson et al. ............. 194/217 |

FOREIGN PATENT DOCUMENTS

JP  2004046335 A  *  2/2004  .............. G06F 15/00

OTHER PUBLICATIONS

Automated Teller Machine, Wikipedia, pp. 1-12; htttp://en.wikipedia.org.
Cheque, Wikipedia, pp. 1-6, Feb. 21, 2007; http://en.wikipedia.org/wiki/Cheque.
Itautec, ATM Check Dispenser, 2006, http://www.itautec.com/br/iPortal/en-US/e357bdf8-05d3-4e0c-8e0f-14d9c2fdb109.htm.

* cited by examiner

*Primary Examiner* — Thien M Le
*Assistant Examiner* — Tae Kim
(74) *Attorney, Agent, or Firm* — Fish & Richardson P.C.

(57) ABSTRACT

Disclosed are systems and methods for providing a financial transaction. The systems and methods provide techniques for providing an automated teller machine (ATM) and allowing a customer to operate the ATM at the ATM to complete the transaction. In addition, the customer, while at the ATM, can communicate with a representative at a centralized hub that is remote from the ATM and the representative can take control of the ATM to complete the transaction.

21 Claims, 12 Drawing Sheets

SYSTEM AND METHOD FOR FINANCIAL TRANSACTIONS

CROSS REFERENCE TO RELATED APPLICATIONS

The present application is related to (1) U.S. Utility application Ser. No. 11/739,412, filed on Apr. 24, 2007, and (2) U.S. Utility application Ser. No. 11/739,454, filed on Apr. 24, 2007, both entitled "System And Method For Financial Transactions", the disclosures of which are incorporated herein by reference for all purposes.

FIELD OF THE DISCLOSURE

Various embodiments of the disclosure pertain to a system and method for providing financial transactions and, more particularly, to a system and method which provide financial transactions using an automated teller machine (ATM) operable to be controlled at the ATM or remotely to complete the transaction.

BACKGROUND

Technology is forcing businesses to rethink their business models in order to survive in today's fast-paced efficient business environment. Similarly, technologically based, personnel-lean companies are forcing large companies to compete in terms of dollars saved rather than in terms of dollars earned. Therefore, in order to compete on level ground, large businesses are re-engineering business processes to accommodate the demand for a low maintenance, low overhead business model. One example of this is creating incentives for customers in the banking, financial and insurance industries to use low overhead cost automatic teller machines (ATMs) and the Internet for transactions, rather than high overhead cost face-to-face transactions. What makes the task arduous for the provider is balancing the shortcomings of the technology based, personnel-lean model with the cost, service and efficiency demands of the $21^{st}$ century customer.

Banking, financial, and insurance institutions are exploiting recent advances in telecommunications, as well as data-storage and retrieval, to increase their customer base by offering customers the convenience of banking, purchasing financial investments, or obtaining insurance anywhere via an ATM or the Internet. Thus, advances in technology, information storage and retrieval, and communications have created a dichotomy in the banking, financial and insurance industry between service, such as face-to-face banking, and solvency, such as ATM/computer/Internet banking. Additionally, ATMs, Internet banking, and other on-line financial and insurance transactions only offer a small portion of services offered by face-to-face transactions at traditional "brick and mortar" institutions.

In light of the foregoing, systems and methods are needed that work cohesively to provide convenience and service to banking, financial and insurance customers, while reducing overhead costs for providers are needed. Accordingly, it would be desirable to provide an improved system and method for providing a financial transaction.

SUMMARY

Various embodiments of the present disclosure are directed to systems and methods for providing financial transactions. The systems and methods provide techniques for providing an ATM and allowing a customer to operate the ATM at the ATM to complete the transaction. In addition, the customer, while at the ATM, can communicate with a representative at a centralized hub that is remote from the ATM and the representative can take control of the ATM to complete the transaction.

BRIEF DESCRIPTION OF THE DRAWINGS

FIG. 1b is a schematic view illustrating an embodiment of an information handling system used with the system for providing a financial transaction of FIG. 1a.

FIG. 1c is a schematic view illustrating an embodiment of a provider used in the system for providing a financial transaction of FIG. 1a.

DETAILED DESCRIPTION

Figure 1A:
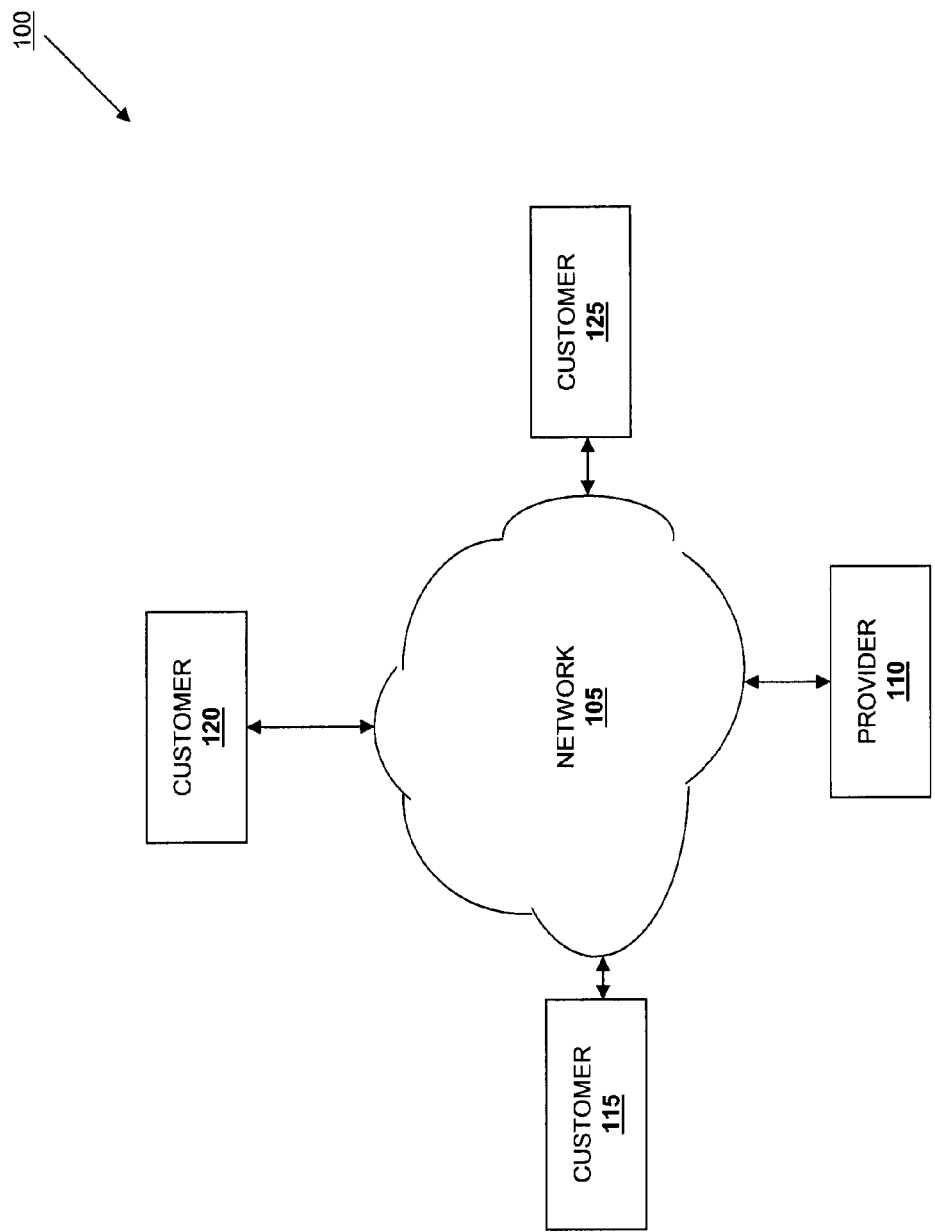
FIG. 1a is a schematic view illustrating an embodiment of a system for providing a financial transaction.

Referring now to FIG. 1a, in one embodiment, a system 100 for providing a banking, financial or insurance transaction is illustrated. In an embodiment, the system 100 may be used to provide a plurality of financial transactions known in the art, such as, for example, banking transactions, insurance transactions, investment transactions, and/or a variety of other financial transactions. The system 100 includes a computer or communication network 105 such as, for example, a Transport Control Protocol/Internet Protocol (TCP/IP) network (e.g., the Internet or an intranet). However, any communication network 105 can be used. A provider 110 is operably coupled to the communication network 105, preferably using a T1 or T3 communication line. A plurality of customers 115, 120 and 125 are also operably coupled to the communication network 105 in order to allow communication between the customers 115, 120 and 125 and the provider 110. In an embodiment, the provider 110 includes a membership organization which provides a plurality of services for its members such as, for example, banking, insurance, financial services, loan providing, and/or a variety of other services known in the art, wherein the members include customers 115, 120 and 125. In an embodiment, the provider 110 includes anyone performing banking, financial or insurance transactions for customers. In an embodiment, the provider 110 is a third party to a customer and a banking, financial or insurance provider where the provider provides banking, financial or insurance accounts for the customer. In an embodiment, the customers 115, 120 and 125 may be, for example, persons acquiring and using a banking, financial, or insurance account.

Each of the provider 110 and the customers 115, 120 and 125 includes a respective network interface for communicating with the communication network 105 (e.g., outputting information to, and receiving information from, the communication network 105), such as by transferring information (e.g., instructions, data, signals) between such customers and the communication network 105. Accordingly, through the communication network 105, the provider 110 communicates with the customers 115, 120 and 125, and the customers 115, 120 and 125 communicate with the provider 110.

For clarity, FIG. 1a depicts only one provider 110. However, the system 100 may include a plurality of providers. Likewise, for clarity, FIG. 1a depicts only three customers 115, 120, and 125. However, the system 100 may include a plurality of customers. In the discussion below, the customer 115 is a representative one of the customers 115, 120, and 125.

Each of the provider 110 and the customers 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the customers 115, 120 and 125 operate within the communication network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the communication network 105).

Figure 1B:
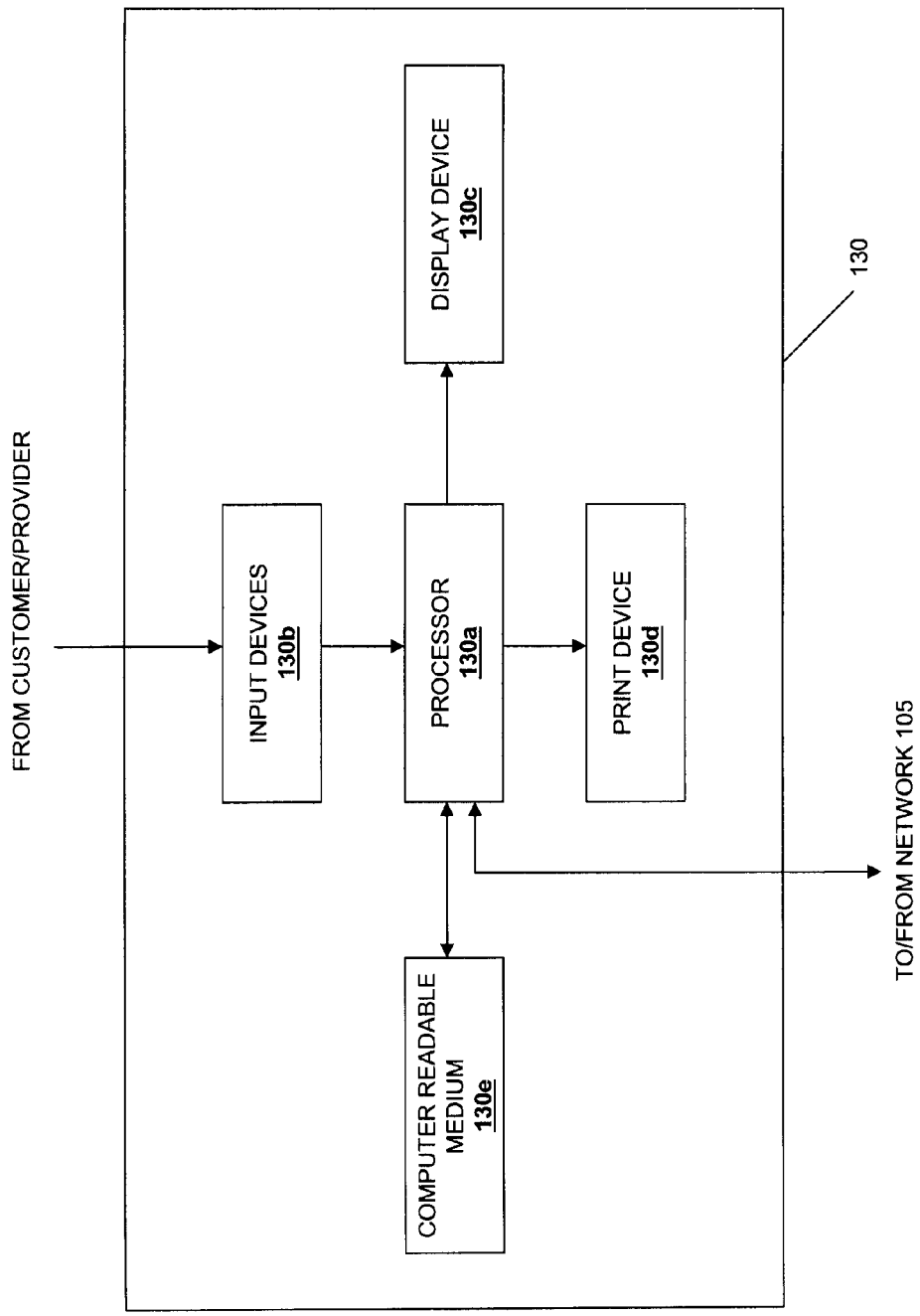

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the communication network 105 and (b) a memory device (e.g., random access memory (RAM) device or read only memory (ROM) device for storing information (e.g., instructions executed by processor 130a and data operated upon by processor 130a in response to such instructions)). Accordingly, the processor 130a is operably coupled to the communication network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is representative of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the communication network 105 which is also a computer readable medium or apparatus. Moreover, the memory device of the IHS 130 is itself a computer readable medium or apparatus.

Figure 1C:
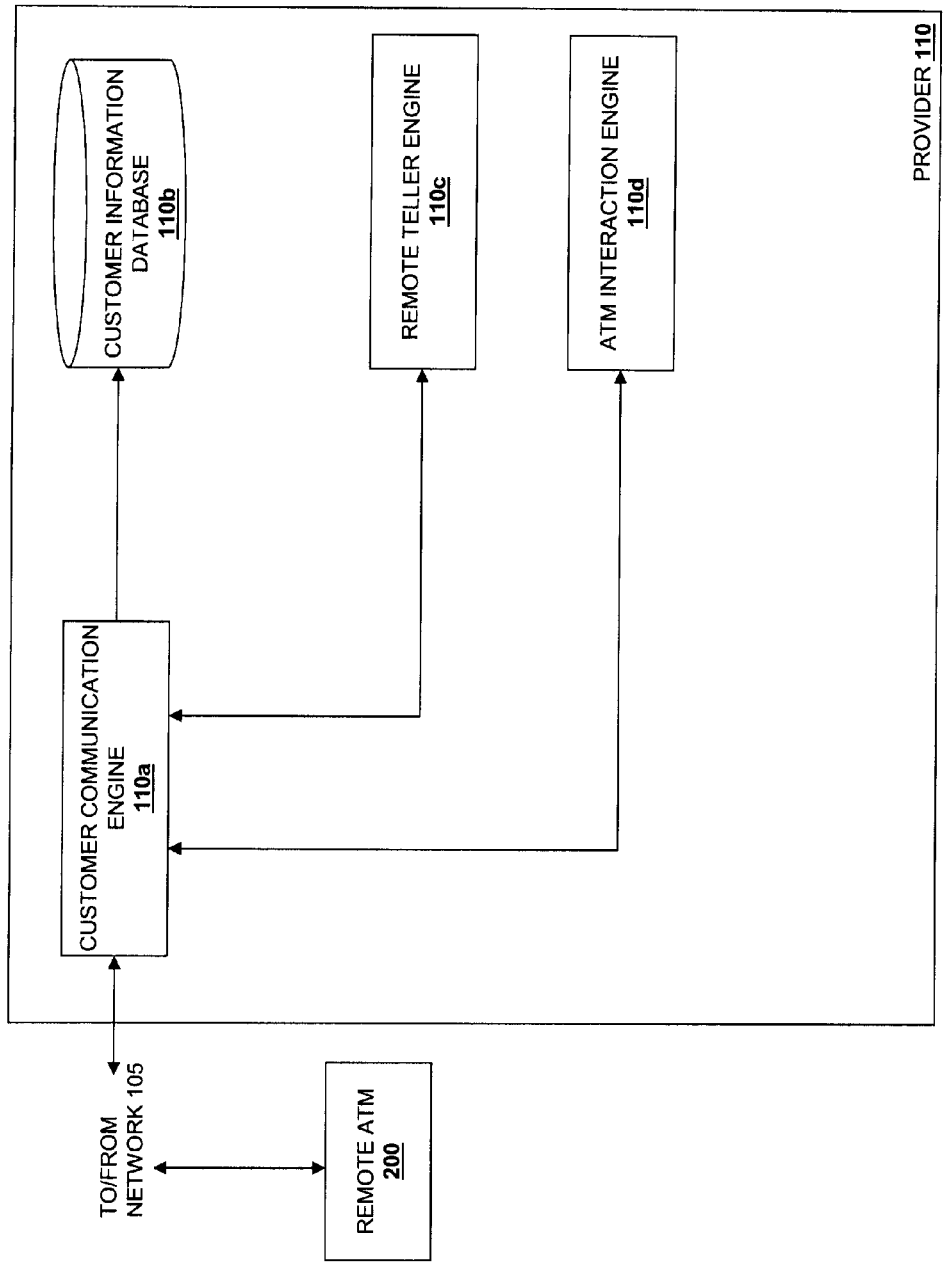

Referring now to FIGS. 1a, 1b and 1c, the provider 110 is illustrated in more detail. A customer communication engine 110a which may be, for example, software stored on the computer-readable medium 130e in the IHS 130, is included in the provider 110 and is operably coupled to the communication network 105, described above with reference to FIG. 1a, and to a customer information database 110b. A remote teller engine 110c which may be, for example, software stored on the computer-readable medium 130e in the IHS 130 or a representative of the provider 110, is included in the provider 110 and is operably coupled to the customer communication engine 110a and to the communication network 105, described above with reference to FIG. 1a. An automated teller machine (ATM) interaction engine 110d which may be, for example, software stored on the computer-readable medium 130e in the IHS 130 or a representative of the provider 110, is included in the provider 110 and is operably coupled to the customer communication engine 110a and to the communication network 105, described above with reference to FIG. 1a. In an embodiment, the customer information database 110b is a conventional database known in the art. In an embodiment, the customer information database 110b may be located outside the provider 110 and still operably coupled to the provider 110 and the customer communication engine 110a through, for example, the communication network 105, described above with reference to FIG. 1a. In an embodiment, the customer information database 110b includes a plurality of databases. In an embodiment, the provider 110 is a membership organization and the customer information database 110b includes a variety of previously collected information on members of the membership organization. In an embodiment, the customer information database 110b is a publicly available database. In an embodiment, the customer information database 110b is a private database which is available to be accessed by the provider 110. In an embodiment, a remote ATM 200 is communicatively connected to the communication network 105 to use for banking, financial and/or insurance transactions.

It is to be understood that the phrase "financial transaction" in this application can mean any transaction that can be performed at a banking or savings and loan type institution, such as, for example, opening/closing an account, depositing, withdrawing, purchasing cashiers checks, obtaining a loan, and/or a variety of other banking or savings and loan transactions known in the art. The term "financial transaction" in this application can also mean any financial transaction performed with a financial institution, such as, for example, purchasing stocks, bonds, mutual funds, individual retirement accounts (IRAs), and/or a variety of other financial transactions known in the art. Additionally, the term "financial transaction" in this application can mean a transaction performed with an insurance institution, such as, for example, purchasing an insurance policy, making a claim on an existing policy, printing a proof of insurance form, and/or a variety of other insurance transactions known in the art. Furthermore, the term "financial transaction" in this application can mean any other transaction for products or services.

It is also to be understood that the phrase "automated teller machine" or "ATM" in this application means any automated device that allows a customer 115 to perform financial transactions as described above and is not limited to banking transactions. Thus, an ATM of the present application may be, for example, a kiosk machine, personal computer, terminal, and/or a variety of other computing devices capable of communicating over a communications network to perform financial transactions.

Figure 2:
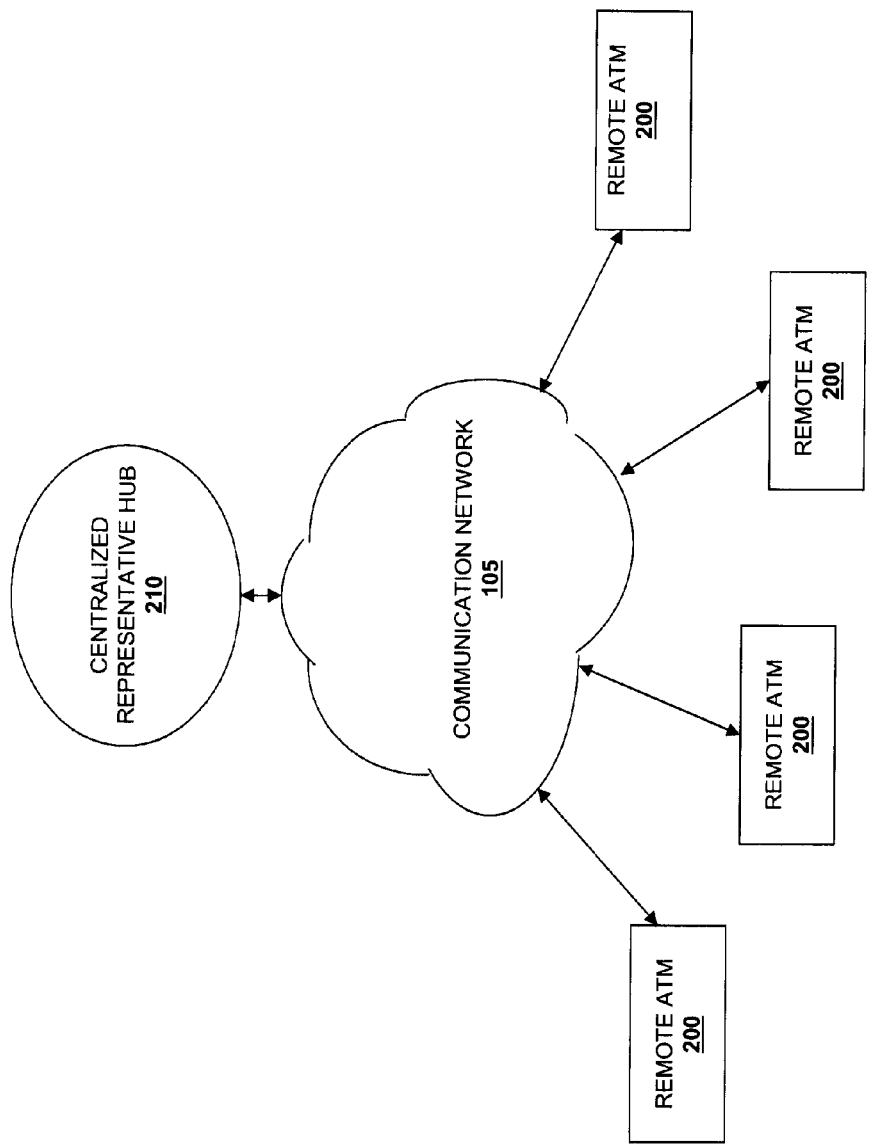
FIG. 2 is a schematic view illustrating an embodiment of a system for providing a financial transaction.

Referring now to FIG. 2, an embodiment of a system for conducting financial transactions is illustrated. In this embodiment, a transaction monitoring station or centralized hub 210 is communicatively connected to the communication network 105. The centralized hub 210 is a center having one or more representatives available to operate IHSs, such as the IHS 130 of FIG. 1b, that allow interaction with one or more remotely located ATMs 200 over the communication network 105. The ATMs 200 can be located anywhere they may communicate with the communication network 105. In an embodiment, there may be any number of centralized hubs 210 interacting with any number of ATMs 200.

In an embodiment, the IHSs 130 used by the representatives include data, audio and video communication, such as teleconferencing or closed circuit communications, available to communicate between the computing device at the centralized hub 210 and the ATMs 200. This communication may be managed or driven by the ATM interaction engine 110d and the customer communication engine 110a of FIG. 1c. The representatives at the centralized hub 210 may use the remote teller engine 110c to take operational control of the ATMs 200. Therefore, the operators at the centralized hub 210 may perform transactions from the centralized hub 210 as if they were at the ATM 200. Thus, with a combination of the customer communication engine 110a, the remote teller engine 110c and the ATM interaction engine 110d, the representative at the centralized hub 210 may interact using audio and video communications with a customer 115 located at, for example, the ATM 200 and assist the customer 115 to complete any financial transaction desired by the customer 115 at the ATM 200. Alternatively, the representative at the centralized hub 210 may take control of the ATM 200 to complete the financial transaction for the customer 115.

Figure 3:
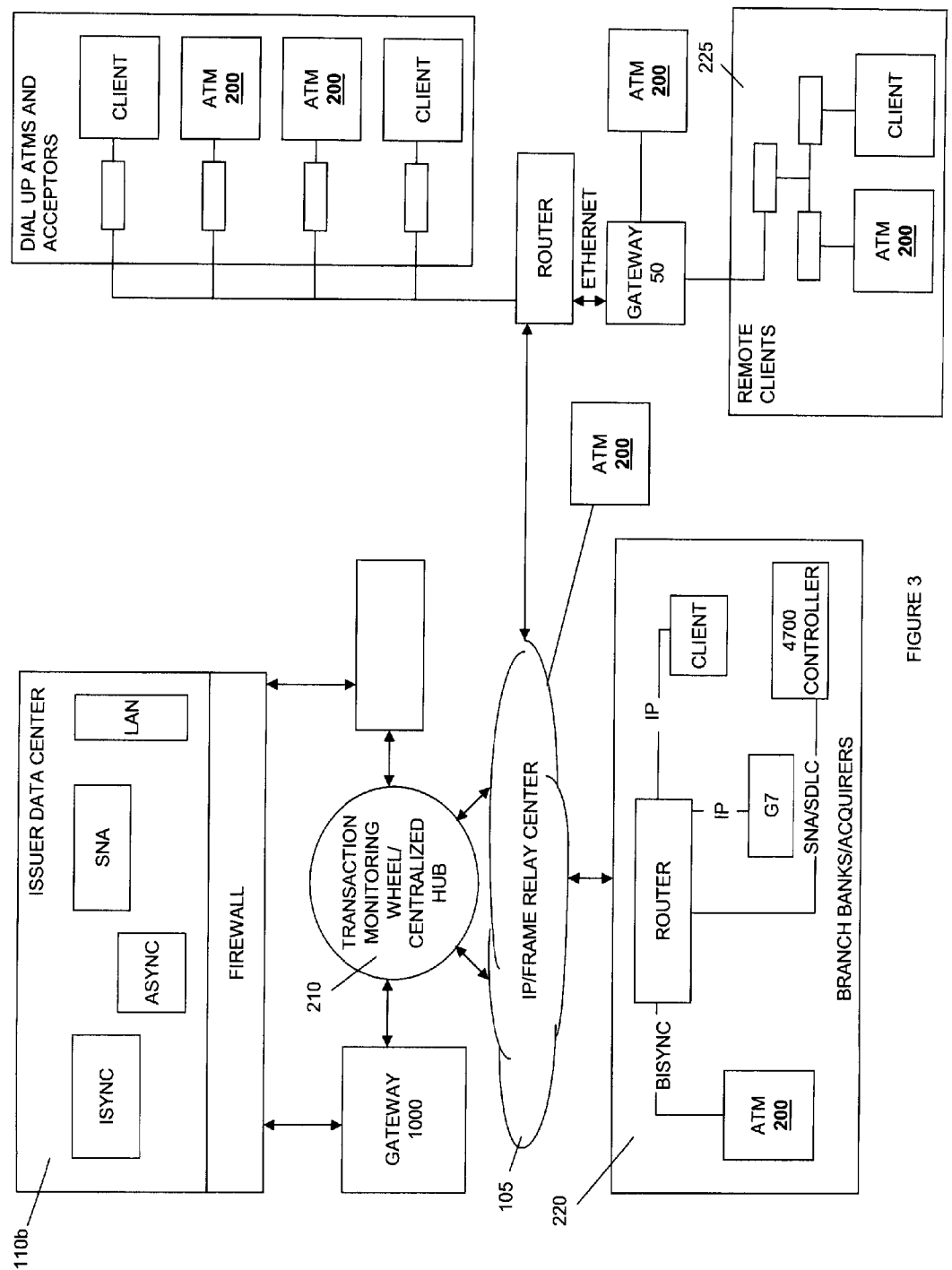
FIG. 3 is an embodiment of the system for providing a financial transaction of FIG. 2.

Referring now to FIG. 3, an embodiment of a system for providing financial transactions is illustrated. In the system, the centralized hub 210 communicates with the customer information database 110b to obtain customer 115 information related to the financial accounts of the customer 115. The representative at the centralized hub 210 may communicate with a customer 115 at an ATM 200 or remotely located virtual banks 215, 220, 225. Data transfer between the centralized hub 210 and the customer information database 110b may pass over a local area network (LAN), wide area network (WAN), the Internet, and/or a variety of other communication networks. Data transfer may also pass through a firewall or other security measures as commonly known in the art. Communication and data transfer between the centralized hub 210 and the ATMs 200 and/or the virtual banks 215, 220, 225 may pass through routers, switches, gateways, and etc. as needed, to provide a secure communication network 105 and supporting hardware and software as understood by one of ordinary skill in the art.

Figure 4:
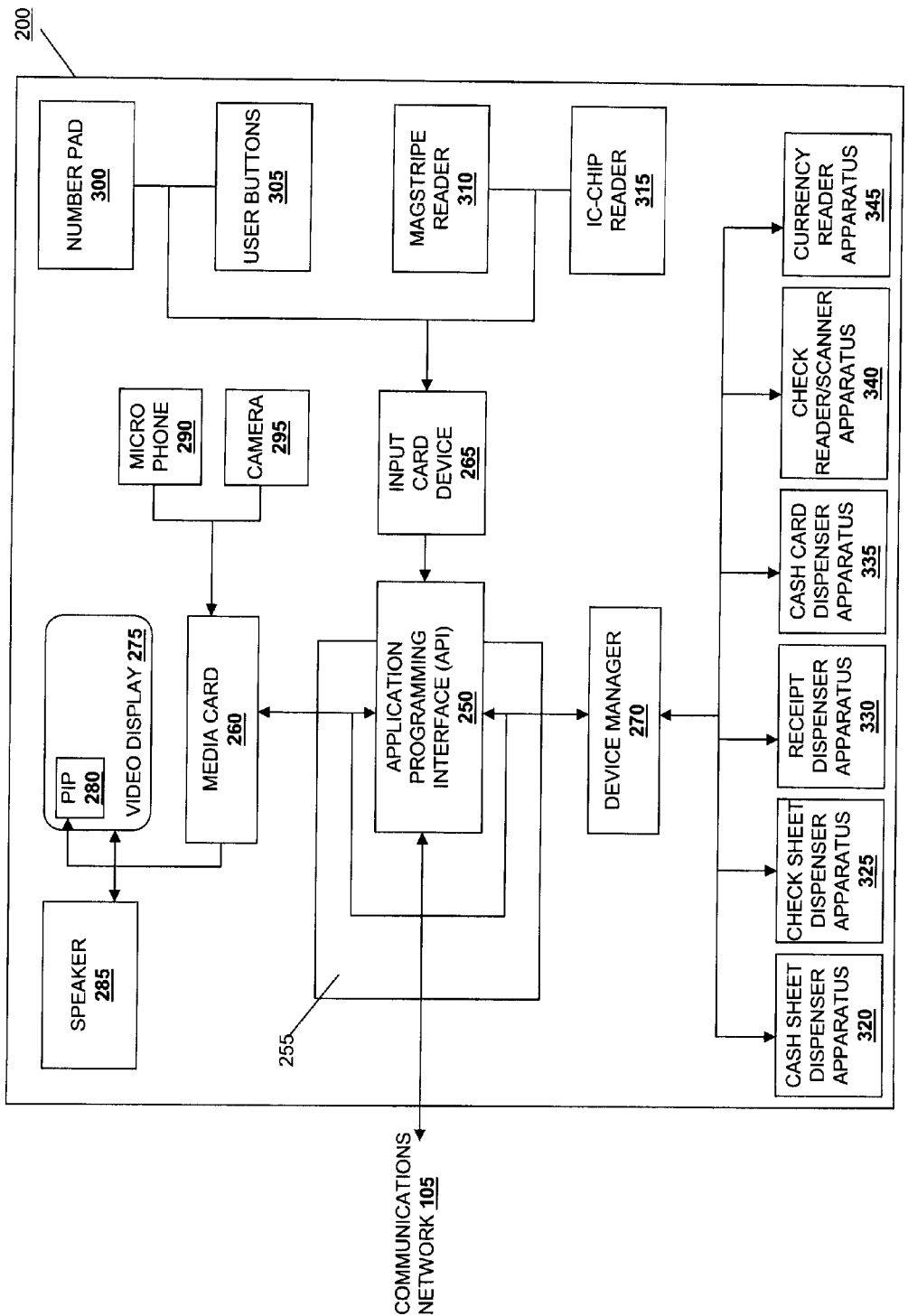
FIG. 4 is a schematic view illustrating an embodiment of an automated teller machine for providing a financial transaction.
Figure 5:
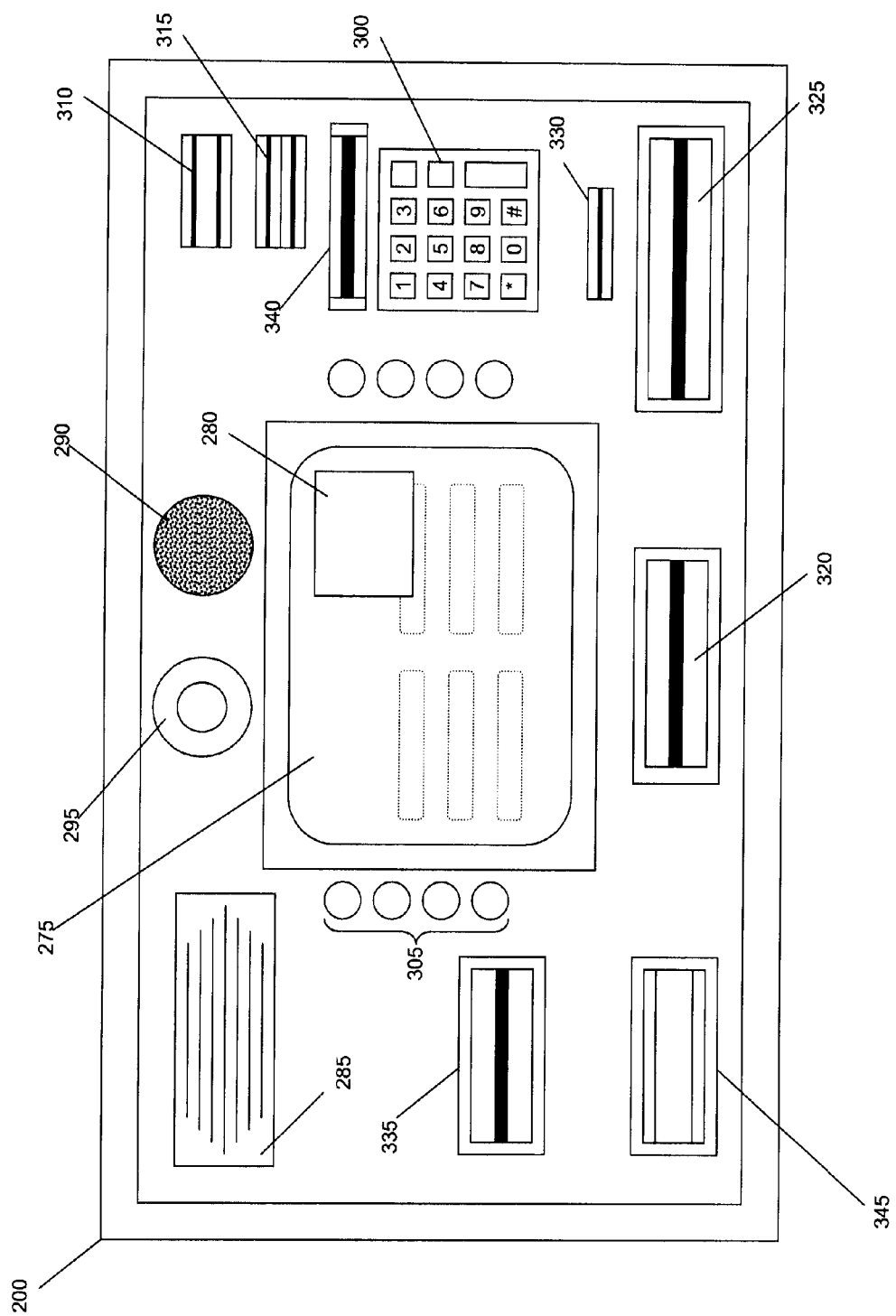
FIG. 5 is a front view of an embodiment of a portion of the automated teller machine of FIG. 4.

Referring now to FIGS. 2, 4 and 5, an embodiment is illustrated of an ATM 200 that may be connected to the communication network 105. In this embodiment, the ATM 200 includes an application programming interface (API) 250 for providing communication between a processor 255 and the communication network 105. For integrating various peripheral devices to the processor 255, the ATM 200 includes a media card 260, an input card device 265 and a device manager 270 communicatively connected to the API 250. These and a variety of other devices known in the art may or may not be used to facilitate data and communication transfers between the ATM 200 and the centralized hub 210.

The media card 260 integrates output from the API 250 and the processor 255 to a video display 275, a picture in picture (PIP) 280 on the video display 275 and a speaker 285. The video display 275 displays on a display device such as for example a cathode ray tube (CRT), liquid crystal display (LCD) and/or a variety of other types of display devices known in the art, allowing the customer 115 at the ATM 200 to view options or other communication messages to interact with the ATM 200 to complete a financial transaction. In an embodiment, the video display 275 is capable of displaying a PIP 280 image. This PIP 280 image may be used to display a video image of a representative at the centralized hub 210. The speaker 285 may be used to transmit audio messages and/or vocal communications from a representative at the centralized hub 210. By having a video image of the representative at the centralized hub 210, along with an audio of the vocal communication of the representative, the customer 115 may interact with the representative as if the representative were located at the remote ATM 200. This creates a "virtual teller" for the customer 115 to interact with to complete financial transactions, eliminating the need for a "bricks and mortar" building at each ATM 200 location. If the customer 115 has questions about the transaction or cannot complete the transaction for some reason, the customer 115 may contact the representative for help. As described above, the representative at the centralized hub 210 may take control of the ATM 200 to complete the transaction for the customer 115. However, if the customer 115 chooses, the customer 115 may complete the financial transaction without the aid of the representative.

To allow the representative at the centralized hub 210 to receive communications from the customer 115, in an embodiment, the ATM 200 includes a microphone 290 and a video camera 295 for transmitting audio and video from the ATM 200 to the centralized hub 210 via the media card 260, the API 250, the processor 255, and the communication network 105. This creates a closed circuit audio/video communication between the ATM 200 and the centralized hub 210.

The input card device 265 receives input signals from a number pad 300, a plurality of customer 115 or customer buttons 305, a magnetic strip reader 310, and/or an integrated circuit (IC) chip reader 315, and allows the customer 115 to communicate to the ATM 200 and/or the representative at the centralized hub 210. The number pad 300 and the customer 115 buttons 305 may be integrated into the video display device 275, for example, if the video display device is a touch screen type display device. The magnetic strip reader 310 and the IC chip reader 315 are common in the industry and are used for reading information such as personal information and account information from a banking/credit card-type device. In addition, biometric reading devices (not shown) may be included on the ATM 200 and used to identify a customer 115. Biometric reading devices generally read unique bodily biometric data using devices such as, for example, fingerprint scanners, eye scanners, and a variety of other unique bodily feature scanners. These biometric reading devices may be integrated with the processor 255 and serve as a testing device to ensure that the customer 115 is authorized to access the respective accounts using the ATM 200. If the customer 115 does not pass the biometric device test, the user 115 may not be allowed to access the account.

Generally, transactions at the ATM 200 begin with the customer 115 inserting a banking/credit account card into reader 310 or 315. Depending on the type of card, the ATM 200 then prompts the customer 115 to enter other information, such as, for example, a personal identification number (PIN) and the type of transaction desired. One of skill in the art will recognize that magnetic strips and IC chips are commonly used on banking/credit cards to provide account information. The readers 310, 315 may be slide-in type readers, proximity type readers or any other type of reader device for reading information from the account card. Additionally, biometric devices may be included on the ATM 200 and used to determine customer 115 identity and related account information. In other words, the customer 115 may only need to submit to a biometric reading device for the ATM 200 to properly identify the customer 115 and associate the customer 115 with the related account or accounts that the customer 115 has authorization to access.

The device manager 270 integrates the API 250 and the processor 255 with a cash dispenser apparatus 320, a check/sheet writer/dispenser apparatus 325, a receipt writer/dispenser apparatus 330, a cash/account card writer/dispenser apparatus 335, a check reader/scanner apparatus 340, and a currency reader apparatus 345. The cash dispenser apparatus 320 counts and dispenses cash currency to the customer 115 when instructed to do so by the processor 255. In addition, the cash dispenser apparatus 320 may report to the processor 255 when the ATM 200 is low on currency or out of currency. The check/sheet writer/dispenser apparatus 325 receives instructions from the processor 255 and prints and dispenses items such as money orders, cashiers checks and any other type document. For example, the check/sheet writer/dispenser apparatus 325 can be used to print new or existing bank or investment account information or statements, insurance policies, proof of insurance cards, stock or annuity certificates and/or a variety of other documents known in the art. The check/sheet writer/dispenser apparatus 325 may also be used to imprint or emboss the printed documents such as, for example, raised numbers or raised seals. The receipt writer/dispenser apparatus 330 may be used in a similar manner as the check/sheet writer/dispenser apparatus 325, and may also be used for printing and dispensing receipts about the financial transaction for the customer 115. The cash/account card writer/dispenser apparatus 335 may be used to electronically code or set-up, print, emboss, and dispense credit and debit type account cards.

The check reader/scanner apparatus 340 is used to receive documents and scan them using methods known in the art. Once the document has been scanned, the ATM 200 and/or the representative at the centralized hub 210 may validate the document for the transaction. In addition, the check reader/scanner apparatus 340 may check security features on the document, such as, for example, water marks, security codes, and/or a variety of other security features known in the art. The check reader/scanner apparatus 340 may also retain or return the scanned documents to the customer 115. The currency reader apparatus 345 may be used to receive and count cash or currency into the ATM 200. The currency reader 345 may check the currency to ensure that the inserted currency is legal tender and not a forgery.

Figure 6:
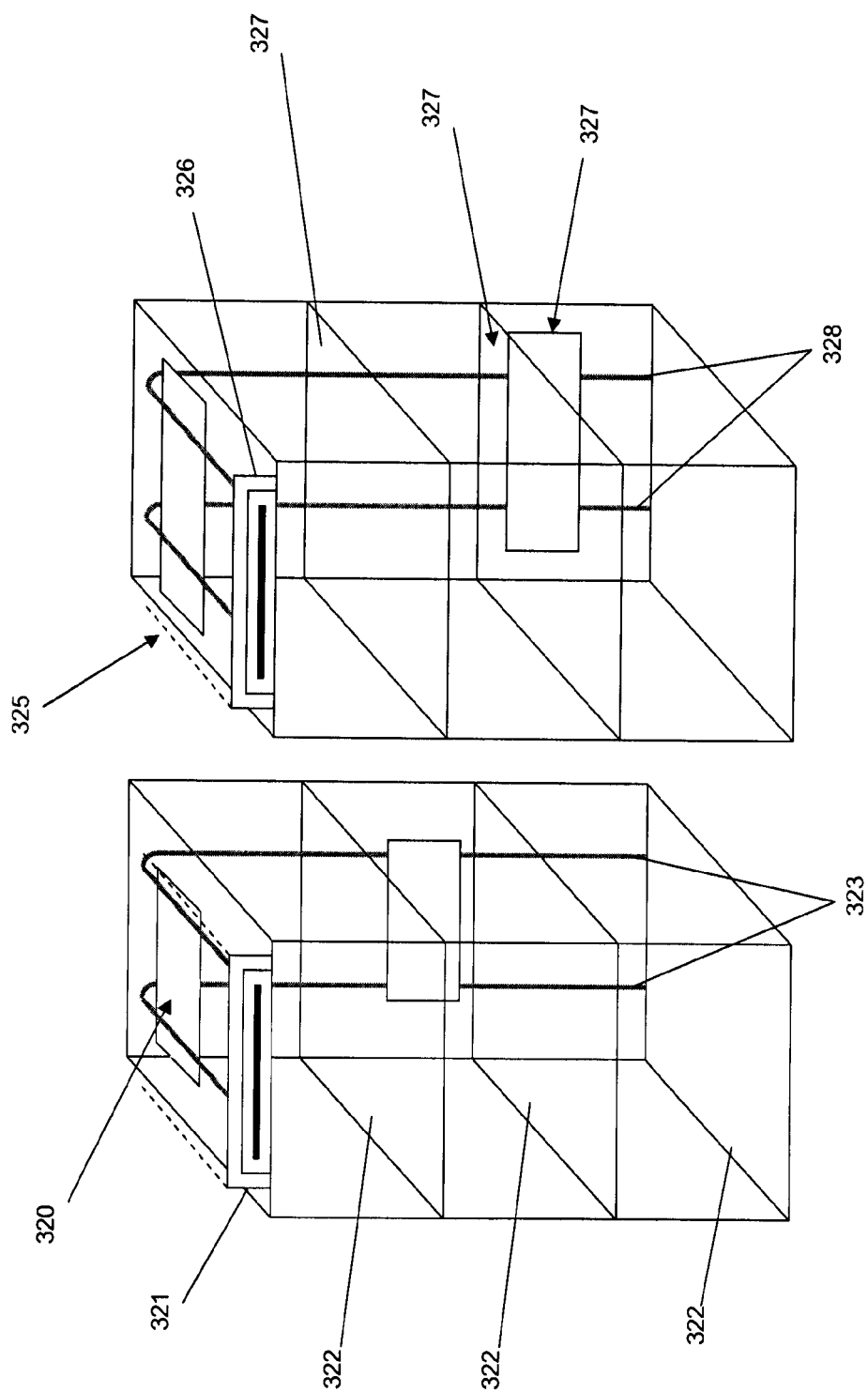
FIG. 6 is a schematic view of an embodiment of a cash dispenser and a check dispenser for use with the automated teller machine of FIG. 4.

Referring now to FIG. 6, skeleton views of an embodiment of the cash dispenser apparatus 320 and the check/sheet writer/dispenser apparatus 325 are illustrated. These dispensers 320, 325 each have a dispenser outlet 321 and 326, respectively, for dispensing currency or a document from the ATM 200 to the customer 115. In an embodiment, the dispensers 320 and 325 are theft and tamper resistant to prevent vandalism and theft. Document trays 322 and 327 allow the dispensers 320 and 325, respectively, to hold and dispense different denominations of currency or different types of documents.

In an embodiment, the dispensers 320 and 325 have conveying systems such as, for example, transport guides 323 and 328, respectively, on the dispensers 320 and 325. The transport guides 323 and 328 move the different denominations of currency or different documents to the outlets 321 and 326, respectively. In addition, the transport guides 323 and 328 may move the document trays 322 and 327, respectively, to the outlets 321 and 326, so that counters (not shown) can count and dispense the documents. Additionally, the ATM 200 may have a coin counter and dispenser (not shown) if desired. Any country and denomination of currency may be used in the currency dispenser 320. Similarly, as described above, the check/sheet writer/dispenser apparatus 325 may be used to print and dispense any type of document desired to complete desired transactions.

Figure 7:
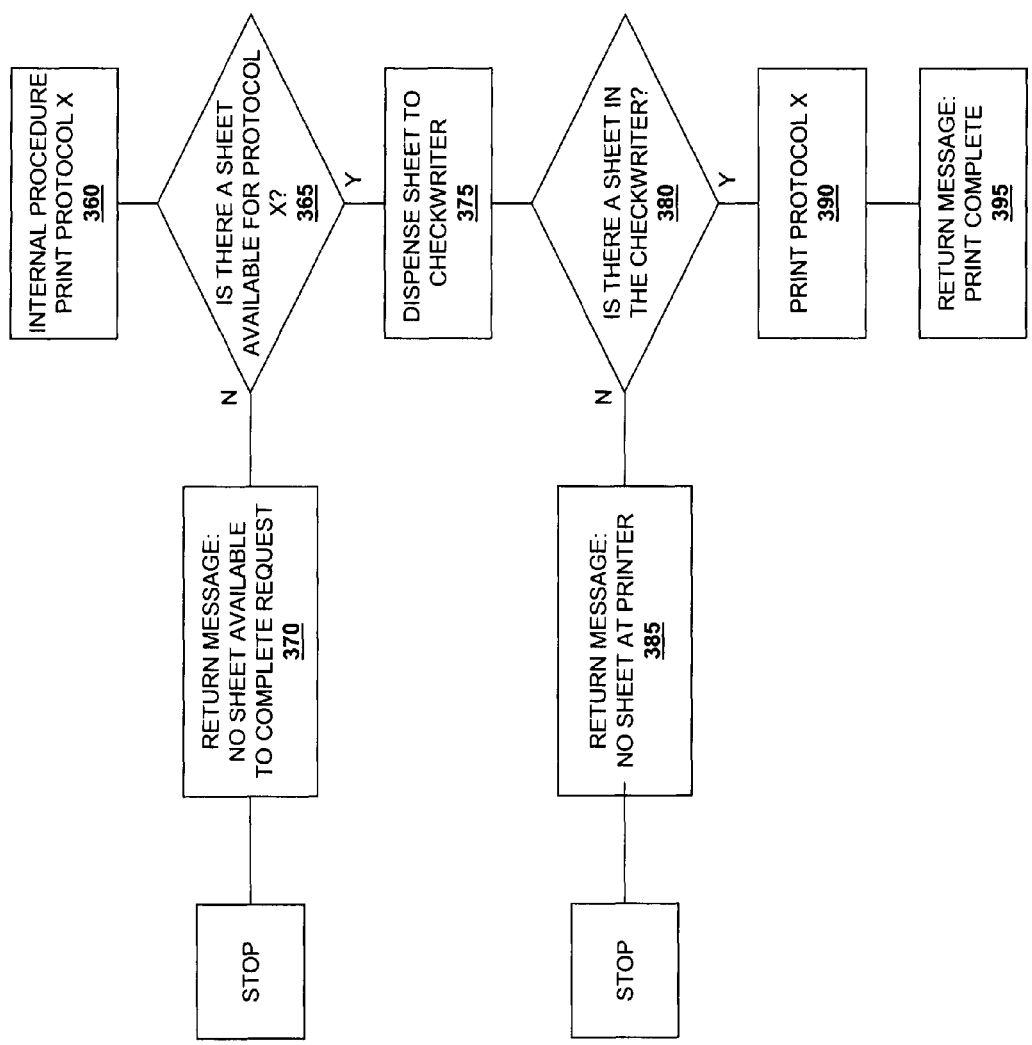
FIG. 7 is a flow chart illustrating an embodiment of a method for printing a document during a transaction.

Referring now to FIG. 7, an embodiment of a method for printing documents using the check/sheet writer/dispenser apparatus 325 is illustrated. The method begins at step 360 with an internal procedure within the ATM 200 and processor 255 to initialize or set up the print protocol. The print protocol is called print protocol X and may be any system or method for printing as understood by those skilled in the art, such as, for example, an instruction or series of instructions in software code such as, for example the ATM interaction engine 110d and/or the remote teller engine 110c, used to cause the check/sheet writer/dispenser apparatus 325 to print. The method proceeds to decision block 365 where it is inquired whether there is a desired sheet to print on available in the document tray 327 for protocol X. If no sheet to print on is available in the document tray 327 to print, the method proceeds to step 370 where the check/sheet writer/dispenser apparatus 325 sends a return message to the processor 255 that no sheet is available to complete the printing request and the sequence stops. However, if there is a sheet available, the method proceeds to step 375 where the document tray 327 supplies the desired sheet from one of the document trays 327 to the printing or check writing portion of the check/sheet writer/dispenser apparatus 325. The method then proceeds to decision block 380 where the printing portion or check writing portion of the check/sheet writer/dispenser apparatus 325 inquires whether there is a sheet to print on available in the printing portion of the check/sheet writer/dispenser apparatus 325. If no sheet is available in the printing portion of the check/sheet writer/dispenser apparatus 325 to print, the method proceeds to step 385 where the check/sheet writer/dispenser apparatus 325 sends a return message to the processor 255 that no sheet is available to complete the printing request and the sequence stops. If there is a sheet in the printing portion of the check/sheet writer/dispenser apparatus 325, the method proceeds to step 390 where the printing portion of the check/sheet writer/dispenser apparatus 325 prints the desired document using print protocol X and dispenses the document via the dispenser outlet at 326. The method then proceeds to step 395 where the check/sheet writer/dispenser apparatus 325 returns a "print complete" message to the processor 255. Other steps in printing documents can be added or deleted as necessary to obtain the desired results for printing documents.

Figure 8:
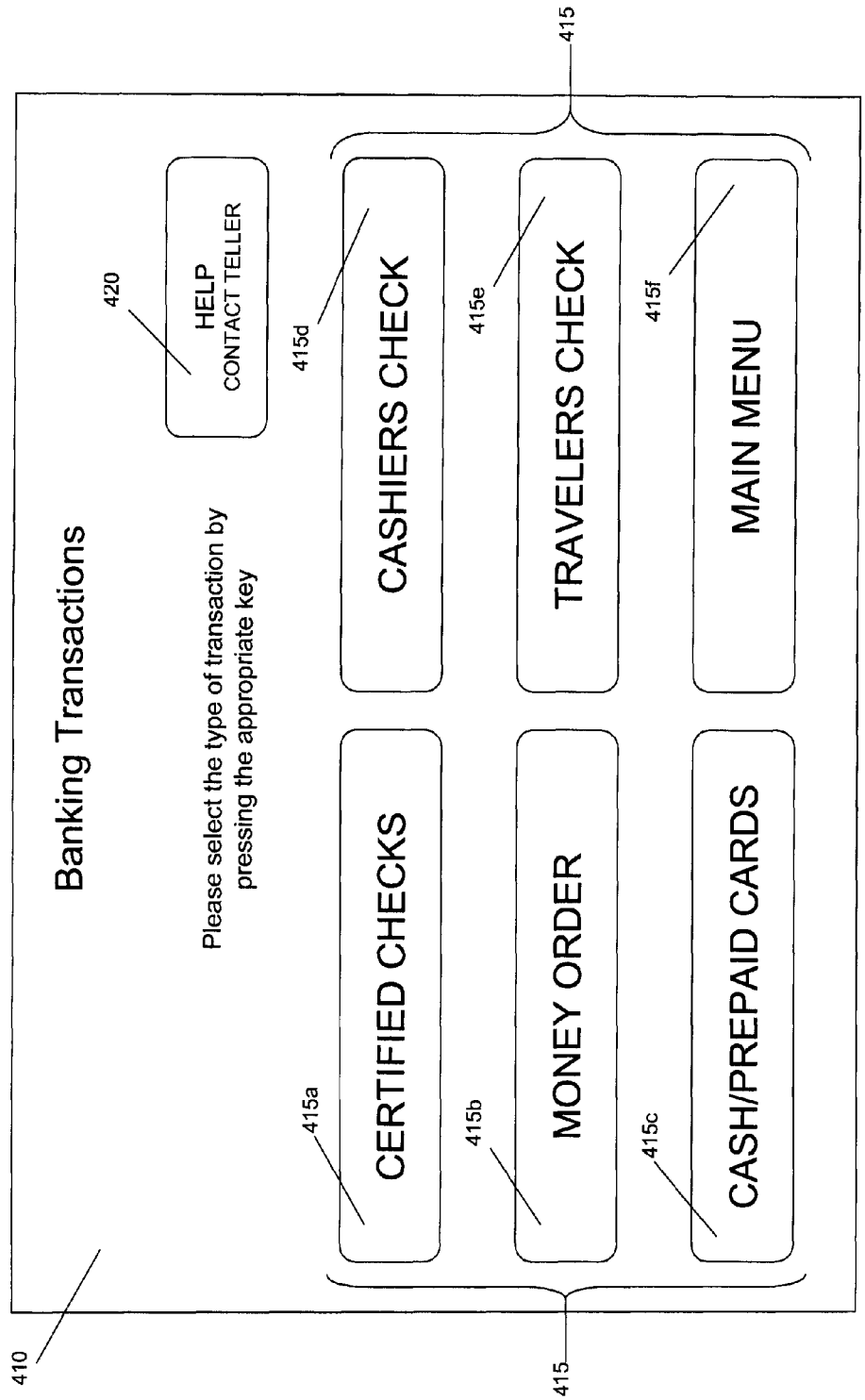
FIG. 8 is a screenshot of an embodiment of a video display for the automated teller machine of FIG. 4.

Referring now to FIGS. 2-5, 8 and 9, a plurality of embodiments of display screen images are illustrated that may be displayed using the video display 275, illustrated in FIGS. 4 & 5, and used to facilitate financial transactions using the ATM 200. FIG. 8 illustrates a banking transactions screen shot 410. The banking transactions screen shot 410 provides a plurality of selection icons 415 to allow the customer 115 to interact with either the ATM 200 or the representative and to input data to complete the desired transaction. Thus, any number of selection icons 415 can be used. The customer 115's desired choice may be input using corresponding customer 115 buttons 305, the number pad 300, or by simply touching the icon 415 if a touch screen display device is used. Additionally, the customer 115 may select the help or contact teller icon 420. As described above, if a customer 115 desires the assistance of a teller or representative, a representative from the centralized hub 210 can communicate with the customer 115 to answer questions, help the customer 115 to complete the transaction, or even take control of the ATM 200 to complete the transaction for the customer 115.

In an embodiment, selection icon 415a instructs the ATM 200 to follow procedures to issue a certified check from the ATM 200. In an embodiment, selection icon 415b instructs the ATM 200 to follow procedures to issue a money order from the ATM 200. In an embodiment, selection icon 415c instructs the ATM 200 to follow procedures to issue cash/prepaid cards from the ATM 200. In an embodiment, selection icon 415d instructs the ATM 200 to follow procedures to issue a cashiers check from the ATM 200. In an embodiment, selection icon 415e instructs the ATM 200 to follow procedures to issue a travelers check from the ATM 200. In an embodiment, selection icon 415f instructs the ATM 200 to follow procedures to proceed to a Main Menu screen.

Figure 9:
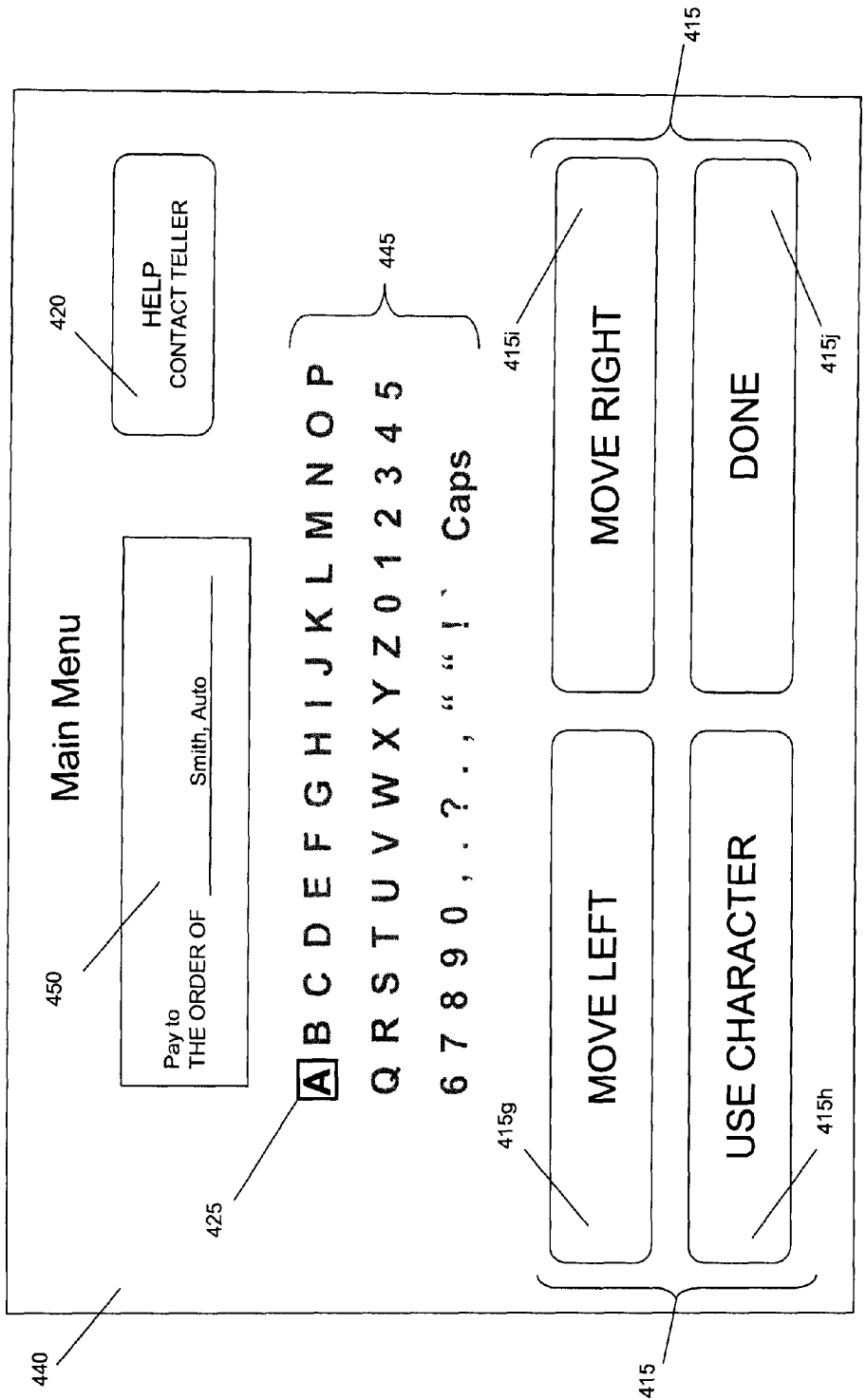
FIG. 9 is a screenshot of an embodiment of a video display for the automated teller machine of FIG. 4.
Figure 10:
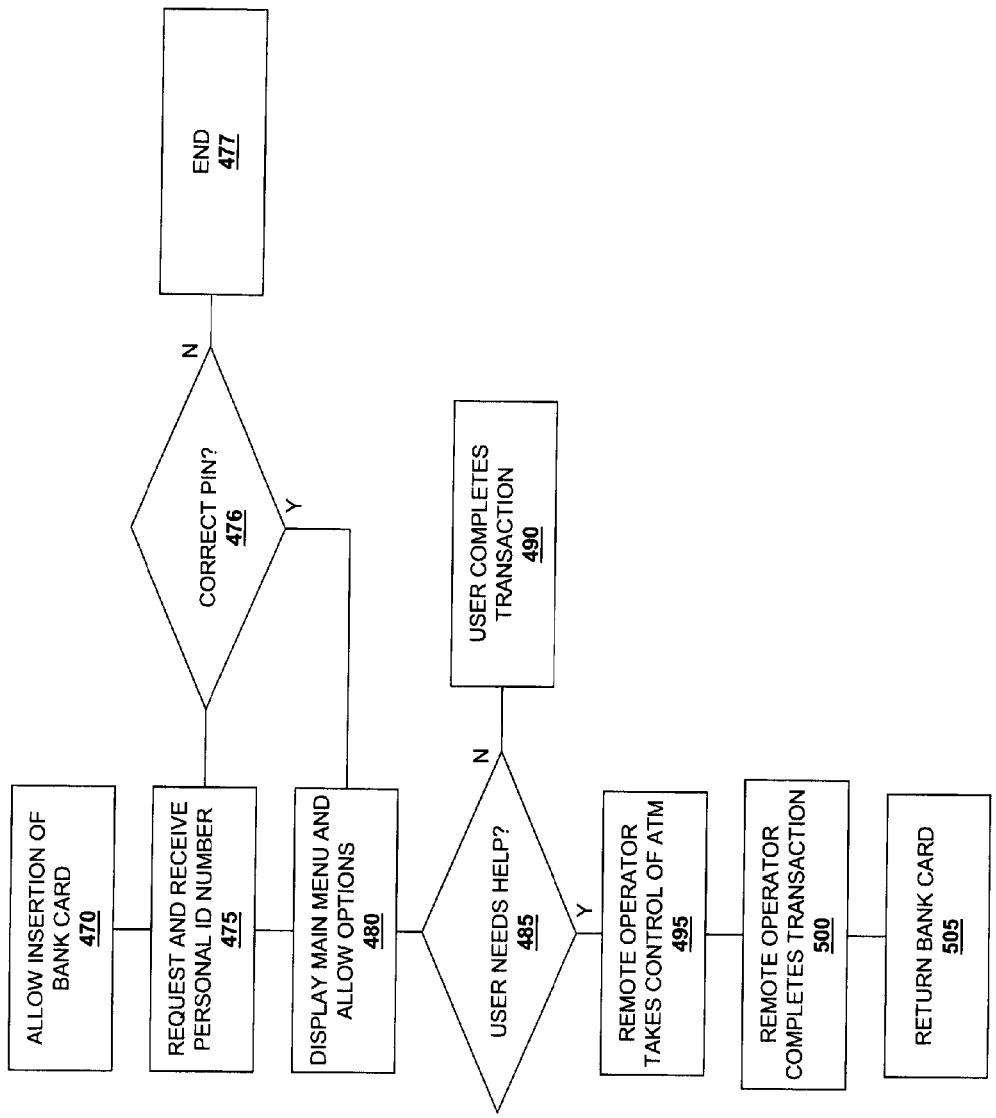
FIG. 10 is a flow chart illustrating an embodiment of a method for providing a financial transaction.

FIG. 9 illustrates an embodiment of a check writer screen 440 for allowing a customer 115 to enter information such as "pay to the order of" information for a check. The customer 115 enters the desired characters using a plurality of selection icons 415 and/or a plurality of alpha/numeric keys 445 in a "pay to the order of" field 450 of the check writer screen 440. The check writer screen 440 also allows the customer 115 to contact a representative for help using the help or contact teller icon 420. These screens and others (not shown) may be used with the video display 275 of the ATM 200 to facilitate financial transactions using the ATM 200.

In an embodiment, selection icon 415g instructs the ATM 200 to follow procedures to move character selection icon 425 to the left. In an embodiment, selection icon 415h instructs the ATM 200 to follow procedures to use the character highlighted by the character selection icon 425 in the "pay to the order of" field 450. In an embodiment, selection icon 415i instructs the ATM 200 to follow procedures to move character selection icon 425 to the right. In an embodiment, selection icon 415j instructs the ATM 200 to follow procedures to use the characters entered into the "pay to the order of" field 450 during the transaction.

Referring now to FIGS. 1a, 1c, 2-5 and 10, an embodiment of a method for operating the ATM 200 is illustrated. It is understood that other sequences of events may take place during the course of financial transactions depending on what type of transactions the customer 115 is performing. The method begins at step 470. In the illustrated embodiment, a customer 115 inserts a bank/account card into the reader device 310 or 315 on the ATM 200. The method proceeds to step 475 where the ATM 200 requests a PIN to ensure that the customer 115 using the account card is the authorized card holder. The method proceeds to decision block 476 where the ATM 200 determines if a correct PIN has been entered. If a correct PIN has not been entered, the method proceeds to step 477 where the sequence ends and the ATM 200 will not allow a transaction to occur. If a correct PIN has been entered, the method proceeds to step 480 where the ATM 200 will display a main menu and allow the customer 115 to proceed with a transaction. During the transaction, the customer 115 is allowed to request help from a live teller or representative or from a computerized avatar. A computerized Avatar may be a virtual system capable of interacting with the customer 115, making decisions, and issuing commands. The method proceeds to decision block 485 where the ATM 200 determines if the customer 115 has requested help. If the customer 115 has not requested help, the method proceeds to step 490 and the customer 115 is allowed to complete the transaction as commonly done using ATMs. If the customer 115 has requested help, the method proceeds to step 495 where a representative at the centralized hub 210 may appear on the video display 275 as a PIP 280 and will communicate with the customer 115 to assist with the transaction and/or take over control of the ATM 200. The method then proceeds to step 500 where the representative completes the transaction for customer 115. Once all the desired transactions are completed, the method proceeds to step 505 where the ATM 200 will return the account card to the customer 115.

When the customer 115 requests that the representative to take over control of the ATM 200, the representative may activate software on an IHS 130 at the centralized hub 210 allowing the representative to see the same screen images shown on the ATM. In addition, the representative may have the ability to see and hear the customer 115 via a closed circuit audio/video conference. The representative may be operable to electronically "press" or otherwise activate the user buttons 305 or the number pad 300 from the IHS 130 using software and the communication network 105. The representative may also be operable to electronically initiate operations at the ATM 200. In an embodiment, the representative may instruct the customer 115 to provide an account card, a PIN, biometric data, a type of transaction desired and/or a variety of other information via the ATM 200 to the representative to assist in the transaction. When the proper items or data have been supplied to the representative, the representative may instruct the ATM 200 to perform the necessary functions to complete the transaction such as, for example, receive payment and to print, emboss, and dispense a bearer instrument, such as, for example, a money order, a certified check, a cashiers check, a travelers check, and/or a prepaid/debit card. The representative may also, for example, receive payment via a credit card, cash, check or bank account to purchase an insurance policy and then print and dispense the policy. The representative may also, for example modify an investment account for the customer 115 and then print and dispense a statement relating the account or the modification for the customer 115 at the ATM 200. By controlling the ATM 200 remotely, the representative may be operable to receive information from any of the devices associated with the ATM 200 and to also instruct any of the devices associated with the ATM 200 to perform a variety of other financial transactions. The ATM 200 may require the customer 115 to give consent to have the representative take control of the ATM 200 by requiring the customer 115 to input a command on the ATM 200 to allow the representative to take control of the ATM 200. Because the ATM 200 is communicatively connected to the centralized hub 210 via the communication network 105, an ATM 200 may notify the centralized hub 210 if any operational problems so that the representative may dispatch repair personnel.

In an exemplary transaction, a customer 115 may walk up to an ATM 200 and insert a banking card into the card reader 310 to begin the transaction. The ATM 200 will request that the customer 115 enter a PIN to ensure the customer 115 is authorized to access the account. If the customer 115 has questions about the account or the transaction, or the customer 115 does not understand how to complete the transaction, the customer 115 may press the help or contact teller icon 420 and a teller or representative may appear as a PIP image 280 so that the representative and customer 115 may have a closed circuit teleconference using audio and video to simulate face-to-face interaction between the representative and the customer 115. Once the representative has answered the customer 115's questions, the PIP may disappear and the customer 115 may complete the transaction on the ATM 200. Alternatively, if the customer 115 does not understand how to complete the transaction or just wants the feel of having a teller/representative complete the transaction, like at a "brick and mortar bank", the representative may take control of the operation of the ATM from the centralized hub 210 and just have the customer 115 insert the proper information or documents into the ATM 200, such as a withdrawal slip into the reader 340, and the representative may instruct the ATM to dispense currency from the ATM to complete the withdrawal. Similarly, the customer 115 may insert a deposit slip into the reader 340 and currency into the currency reader 345 and the representative can complete the deposit transaction. If desired, the customer 115 may press the help or contact teller icon 420 before doing anything to get help from the representative for all steps in the transaction.

In another exemplary transaction using the ATM 200, a customer 115 may be walking past the ATM 200 and hear an advertisement about insurance, investments, or other products or services coming from the video display device 275 and the speaker 285. In this case, the customer 115 may (1) listen to the advertisement playing on the ATM 200, (2) read more information by selecting a customer button 305 and then complete a purchase or transaction, and/or (3) contact a teller/representative for live information and interaction about the available products or services offered by the provider 110 and then interact with the representative to complete the transaction.

These examples of transactions are only a small sampling of the unlimited possibilities using the interactive ATM 200. Those of ordinary skill in the art will understand that the interaction between the representative at the centralized hub 210 and the customer 115 at the ATM 200 allow the ATM 200 to be used for any type of transaction for goods or services and improves customer service without having a need for the high overhead cost of facilities and staff.

In light of the previous, embodiments of the ATM 200 may be located world wide and perform essentially as stand alone banking, investment and insurance financial centers, allowing real time face-to-face communications twenty-four hours a day, seven days a week with a live representative via closed circuit audio/video. The ATMs 200 may be stand configured as walk-up, drive-up or otherwise. The representative for the system may be an automated, computerized avatar capable of interacting with the customer 115 and performing tasks. A customer 115s may receive assistance for any type of service desired. This system and method significantly reduces the overhead costs of building complete financial centers, yet provides similar services and results. The ATM 200 may be located in existing banks, stores, military bases, police stations, etc. The systems and methods of the present application may be in compliance with applicable ISO/ISE parameters and adherence to ISO 8583 and ANSI X4.16 protocols.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for issuing a document at an automated teller machine (ATM), the method comprising:

displaying a menu on a display screen of the ATM, the menu including selectable options to dispense a cashier's check, a certified check, a money order, a traveler's check, and a prepaid cash card;

receiving, through the display screen of the ATM, a selection to dispense the cashier's check, the certified check, the money order, or the traveler's check;

generating a check writer screen allowing a customer to enter payee information into the cashier's check, the certified check, the money order, or the traveler's check that was selected, wherein the check writer screen includes a selectable option to request help from a customer service representative;

receiving, through the selectable option to request help from the customer service representative included on the check writer screen generated on the display screen of the ATM, a request from the customer for help;

transmitting, by the ATM, the request for help to a centralized hub in communication with the ATM;

requiring, from the customer, consent to allow the customer service representative to control the ATM;

receiving the required consent from the customer, wherein the customer provides consent using a command on the ATM;

in response to receiving the required consent from the customer, allowing the customer service representative to control the ATM remotely to assist the customer, wherein communicating between the customer service representative and the ATM comprises using two-way audio communication, wherein a same screen image displayed to the customer is displayed to the customer service representative;

instructing the ATM to perform an operation based on a command received from the customer service representative to complete functions needed before dispensing the cashier's check, the certified check, the money order, or the traveler's check; and receiving payment from the customer via the ATM for any charges related to issuing the cashier's check, the certified check, the money order, or the traveler's check to the customer.

2. The method of claim 1, wherein communicating between the customer service representative and the ATM further comprises using two-way video communication.

3. The method of claim 1, wherein the customer service representative is a system represented by a computerized avatar capable of interacting with the customer, making decisions, and issuing commands to the ATM.

4. The method of claim 1, further comprising receiving, at the ATM, biometric data from the customer to ensure the customer is authorized to access a customer account to retrieve the payment for issuing of the cashier's check, the certified check, the money order, or the traveler's check that was selected.

5. The method of claim 1, wherein the ATM is further operable to perform a transaction to dispense a credit card and a debit card.

6. The method of claim 1, wherein the method further comprises:
receiving, by the ATM, a document relating to a pre-existing insurance account;
scanning the document;
transmitting, by the ATM, the scanned document to an insurance provider; and
returning the document to the customer at the ATM.

7. The method of claim 1, further comprising sending a signal from the ATM to the centralized hub notifying the centralized hub of any operational problems so that the customer service representative may dispatch repair personnel.

8. A non-transitory, computer-readable medium of a computer system comprising instructions, which, when executed by a processor, cause the processor to complete a transaction, the instructions comprising instructions for:

identifying, at an automated teller machine (ATM), a customer as an account holder of one or more customer accounts including pre-existing insurance accounts provided to the customer by an insurance provider, wherein the ATM is operable to perform the transaction relating to the pre-existing insurance accounts or to dispense a cashier's check, a certified check, a money order, a traveler's check, a credit card, a debit card, and a prepaid cash card;

receiving, through a display screen of the ATM, a selection to dispense the cashier's check, the certified check, the money order, or the traveler's check;

generating a check writer screen allowing the customer to enter payee information into the cashier's check, the certified check, the money order, or the traveler's check that was selected, wherein the check writer screen includes a selectable option to request help from a customer service representative;

receiving, through the selectable option to request help from the customer service representative included on the check writer screen generated on the display screen of the ATM, a request from the customer for help;

transmitting, by the ATM, to a centralized hub in communication with the ATM, the request for help;

requiring, from the customer, consent to allow the customer service representative to control the ATM;

receiving the required consent from the customer, wherein the customer provides consent using a command on the ATM;

controlling the ATM remotely from the centralized hub to complete the transaction, wherein:
the control of the ATM is directed by the customer service representative,
communicating between the customer service representative and the ATM comprises two-way audio communication, and
a same screen image displayed to the customer is displayed to the customer service representative;

instructing the ATM to perform an operation based on a command received from the customer service representative to complete functions needed before dispensing the cashier's check, the certified check, the money order, or the traveler's check; and receiving payment from the customer via the ATM for any charges related to issuing the cashier's check, the certified check, the money order, or the traveler's check to the customer.

9. The non-transitory, computer-readable medium of claim 8, wherein communicating between the customer service representative and the ATM further comprises two-way video communication.

10. The non-transitory, computer-readable medium of claim 8, wherein the customer service representative is a system represented by a computerized avatar capable of interacting with the customer, making decisions, and issuing commands to the ATM.

11. The non-transitory, computer-readable medium of claim 8, wherein the ATM is operable to receive biometric data from the customer to ensure the customer is authorized to receive the cashier's check, the certified check, the money order, or the traveler's check.

12. The non-transitory, computer-readable medium of claim 8, wherein the ATM includes a speaker to generate audio signals.

13. The non-transitory, computer-readable medium of claim 12, wherein the ATM is further operable to:
 play, using the speaker, an advertisement relating to an insurance product;
 display, on the display screen of the ATM, additional information relating to the advertised insurance product; and
 contact an insurance representative, when requested by the customer, for a live discussion relating to the advertised insurance product.

14. The non-transitory, computer-readable medium of claim 8, wherein the instructions further comprise instructions for:
 receiving, by the ATM, a document relating to the pre-existing insurance accounts;
 scanning the document;
 transmitting, by the ATM, the scanned document to the insurance provider; and
 returning the document to the customer at the ATM.

15. A method comprising:
 displaying a menu on a display screen of an automated teller machine (ATM), the menu including selectable options to dispense a cashier's check, a certified check, a money order, a traveler's check, and a prepaid cash card;
 receiving, through the display screen of the ATM, a selection to dispense the cashier's check, the certified check, the money order, or the traveler's check;
 generating a check writer screen allowing a customer to enter payee information into the cashier's check, the certified check, the money order, or the traveler's check that was selected, wherein the check writer screen includes a selectable option to request help from a customer service representative;
 receiving, through the selectable option to request help from the customer service representative included on the check writer screen generated on the display screen of the ATM, a request from the customer for help;
 transmitting, by the ATM, to a centralized hub in communication with the ATM, the request for help;
 requiring, from the customer, consent to allow the customer service representative to control the ATM, wherein the customer service representative is an avatar generated by a virtual system at the centralized hub capable of interacting with the customer, making decisions, and issuing commands to the ATM;
 receiving the required consent from the customer, wherein the customer provides consent using a command on the ATM;
 controlling the ATM remotely from the centralized hub to assist the customer, wherein:
  the ATM is controlled by the virtual system,
  communicating between the virtual system and the ATM comprises two-way audio communication, and
  a same screen image displayed to the customer is displayed to the virtual system at the centralized hub;
 instructing the ATM to perform an operation based on a command received from the virtual system, wherein the operations include requesting payment, printing, embossing, and dispensing the cashier's check, the certified check, the money order, or the traveler's check that was selected; and
 receiving payment from the customer via the ATM for any charges related to issuing the cashier's check, the certified check, the money order, or the traveler's check that was selected.

16. The method of claim 15, wherein communicating between the virtual system and the ATM further comprises two-way video communication.

17. The method of claim 15, further comprising switching control of the ATM from the avatar generated by the virtual system to a live customer service representative upon request from the customer.

18. The method of claim 15, wherein the ATM is operable to receive biometric data from the customer to ensure the customer is authorized to access a customer account to pay for the issuing of the cashier's check, the certified check, the money order, or the traveler's check that was selected.

19. The method of claim 15, wherein the ATM includes a speaker to generate audio signals.

20. The method of claim 19, wherein the ATM is further operable to perform a transaction to:
 play, using the speaker, an advertisement relating to an insurance product;
 display, on the display screen of the ATM, additional information relating to the advertised insurance product; and
 contact an insurance representative, when requested by the customer, for a live discussion relating to the advertised insurance product.

21. The method of claim 15, wherein the method further comprises:
 receiving, by the ATM, a document relating to a pre-existing insurance account;
 scanning the document;
 transmitting, by the ATM, the scanned document to an insurance provider; and
 returning the document to the customer at the ATM.

* * * * *

UNITED STATES PATENT AND TRADEMARK OFFICE
CERTIFICATE OF CORRECTION

PATENT NO. : 8,833,639 B1  Page 1 of 1
APPLICATION NO. : 11/739349
DATED : September 16, 2014
INVENTOR(S) : John C. Hopkins, III It is certified that error appears in the above-identified patent and that said Letters Patent is hereby corrected as shown below:

Title Page, Col. 2 Item (56), (Other Publications), Delete "htttp://en." And insert -- http://en. --

Signed and Sealed this
Thirtieth Day of December, 2014

Michelle K. Lee
*Deputy Director of the United States Patent and Trademark Office*